(12) United States Patent
Srivastava et al.

(10) Patent No.: US 11,763,138 B2
(45) Date of Patent: Sep. 19, 2023

(54) METHOD AND SYSTEM FOR GENERATING SYNTHETIC DATA USING A REGRESSION MODEL WHILE PRESERVING STATISTICAL PROPERTIES OF UNDERLYING DATA

(71) Applicant: Intuit Inc., Mountain View, CA (US)

(72) Inventors: Ashok N. Srivastava, Mountain View, CA (US); Malhar Siddhesh Jere, Mountain View, CA (US); Sumanth Venkatasubbaiah, San Jose, CA (US); Caio Vinicius Soares, Mountain View, CA (US); Sricharan Kallur Palli Kumar, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 828 days.

(21) Appl. No.: 16/698,746

(22) Filed: Nov. 27, 2019

(65) Prior Publication Data

US 2021/0158129 A1     May 27, 2021

(51) Int. Cl.
*G06N 3/08*    (2023.01)
*G06N 3/047*   (2023.01)
*G06F 7/58*    (2006.01)

(52) U.S. Cl.
CPC ............... *G06N 3/047* (2023.01); *G06F 7/58* (2013.01); *G06N 3/08* (2013.01)

(58) Field of Classification Search
CPC .......... G06N 3/0472; G06N 3/08; G06F 7/58; G06F 21/6254; G06F 21/6245
See application file for complete search history.

(56) References Cited

U.S. PATENT DOCUMENTS

| | | | |
|---|---|---|---|
| 10,460,235 B1 * | 10/2019 | Truong | G06K 9/6256 |
| 10,860,892 B1 * | 12/2020 | Truong | G06F 3/0652 |
| 2014/0325251 A1 * | 10/2014 | Marwah | G06F 16/2477 |
| | | | 713/500 |
| 2018/0018590 A1 * | 1/2018 | Szeto | G16H 40/20 |
| 2018/0247078 A1 * | 8/2018 | Newman | G06F 16/93 |
| 2020/0311603 A1 * | 10/2020 | Qiu | G06N 5/04 |
| 2021/0000442 A1 * | 1/2021 | Marshall | A61B 7/008 |
| 2022/0078425 A1 * | 3/2022 | Wang | H04N 19/167 |

FOREIGN PATENT DOCUMENTS

CA     3033438 A1 * 12/2019 ............ G06F 17/14

* cited by examiner

*Primary Examiner* — Lynn D Feild
*Assistant Examiner* — Abdullah Almamun
(74) *Attorney, Agent, or Firm* — Ferguson Braswell Fraser Kubasta PC (57) ABSTRACT

A method for generating a synthetic dataset involves generating discretized synthetic data based on driving a model of a cumulative distribution function (CDF) with random numbers. The CDF is based on a source dataset. The method further includes generating the synthetic dataset from the discretized synthetic data by selecting, for inclusion into the synthetic dataset, values from a multitude of entries of the source dataset, based on the discretized synthetic data, and providing the synthetic dataset to a downstream application that is configured to operate on the source dataset.

20 Claims, 7 Drawing Sheets

FIG. 1

200
Example Source
Dataset A

| Name | Age |
|------|-----|
| Mike | 23 |
| Fred | 27 |
| John | 56 |
| Jeff | 73 |

250
Example Source
Dataset B

| Name | Income |
|------|--------|
| a | 10 |
| b | 15 |
| c | 20 |
| d | 25 |
| e | 23 |
| f | 21 |
| g | 32 |
| h | 45 |
| i | 11 |
| j | 15 |
| k | 23 |
| l | 14 |
| m | 5 |

532
Cumulative Distribution Function of Discretized Dataset

| Index | Discretized Dataset Entry | CDF |
|---|---|---|
| 0 | (0,0) | 1/7 |
| 1 | (1,0) | 2/7 |
| 2 | (2,1) | 3/7 |
| 3 | (3,2) | 4/7 |
| 4 | (3,1) | 5/7 |
| 5 | (1,3) | 6/7 |
| 6 | (1,2) | 7/7 |

METHOD AND SYSTEM FOR GENERATING SYNTHETIC DATA USING A REGRESSION MODEL WHILE PRESERVING STATISTICAL PROPERTIES OF UNDERLYING DATA

BACKGROUND

Commercial, governmental and academic organizations are increasingly becoming dependent on the availability of significant volumes of data for data science, machine learning, and other applications. For various reasons, the use of actual data may be undesirable. For example, there may be privacy concerns, a lack of sufficient actual data, etc. Accordingly, it may be desirable to use synthesized data as an alternative to or in addition to actual data.

SUMMARY

In general, in one aspect, one or more embodiments relate to a method for generating a synthetic dataset, the method comprising: generating discretized synthetic data based on driving a model of a cumulative distribution function (CDF) with random numbers, wherein the CDF is based on a source dataset; generating the synthetic dataset from the discretized synthetic data, comprising: selecting, for inclusion into the synthetic dataset, values from a plurality of entries of the source dataset, based on the discretized synthetic data; and providing the synthetic dataset to a downstream application that is configured to operate on the source dataset.

In general, in one aspect, one or more embodiments relate to a method for securely driving a downstream application, the method comprising: obtaining a source dataset for driving the downstream application; generating a discretized dataset from the source dataset; generating a cumulative distribution function (CDF) for the discretized dataset; establishing a model of the CDF; obtaining random numbers; generating discretized synthetic data by driving the model of the CDF with the random numbers, wherein the discretized synthetic data comprises indices identifying bins of the CDF; generating a synthetic dataset by selecting, for the synthetic dataset, values from a plurality of entries in the source dataset, based on the bins; and providing the synthetic dataset to the downstream application as a substitute for the source dataset.

In general, in one aspect, one or more embodiments relate to a system for generating a synthetic dataset, the system comprising: a random number source configured to generate random numbers with a uniform distribution; a data repository storing a source dataset; and a computer processor configured to execute instructions to perform: obtaining the source dataset; generating a discretized dataset from the source dataset; generating a cumulative distribution function (CDF) for the discretized dataset; establishing a model of the CDF; obtaining the random numbers from the random number generator; generating discretized synthetic data by driving the model of the CDF with the random numbers, wherein the discretized synthetic data comprises indices identifying bins of the CDF; and generating the synthetic dataset by selecting, for the synthetic dataset, values from a plurality of entries in the source dataset, based on the bins.

Other aspects of the disclosure will be apparent from the following description and the appended claims.

DETAILED DESCRIPTION

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure enable the generation of synthetic data. The synthesized data may have statistical properties reflecting the statistical properties of the underlying actual data (or specified desired characteristics), while not being identical to the underlying actual data The synthesized data may be used to serve various downstream applications, such as the exploration of the synthesized data, development and testing of data processing algorithms, sharing with collaborators, etc. As a result, access to the actual data may be limited or even blocked, thereby addressing privacy concerns. The described methods may be applied to continuous and categorical data. Consider, for example, the development of software applications enabling users to file income tax returns. As new features are added, and/or existing features are updated, it may be necessary to extensively test and validate these features. Also, when a feature is based on machine learning, the underlying machine learning algorithm may require training. While an abundance of data may be available in databases storing information of existing users, the stored data may be highly confidential, including information such as income, names, addresses, demographic information, etc. Accordingly, the stored data, while available, may not be suitable for sharing with the software developers wanting to test newly developed or updated features, train machine learning algorithms, etc. Similar problems may exist when such data are to be shared with collaborators or team members. For example, software development may be conducted abroad, and it may be undesirable or even illegal to forward certain data to a site that is located abroad. Many other scenarios in which actual data is available but not suitable for use or sharing exist. For many or all of these scenarios, the availability of synthetic data offers a viable alternative to the use of the actual data.

Embodiments of the disclosure are scalable and may produce synthetic data in a computationally efficient manner on commodity hardware. To produce synthetic data as needed, the described methods may be executed either locally, on an enterprise environment, or in a virtualized environment, e.g., on elastic cloud computing services.

In one or more embodiments, the generation of synthetic data is based on a pseudo-random sampling, such as using an inverse transform sampling. More specifically, the described methods are based on a continuous random variable X with a cumulative distribution function $F_X$. Assume that X represents the actual data to be modeled. It logically follows that the random variable $Y=F_X(X)$ has a uniform distribution in, for example, the interval [0, 1]. Accordingly, the inverse of $F_X(Y)$ would have the same distribution as X. In one or more embodiments, the inverse transform may, thus, be provided with pseudo-random numbers in the interval [0, 1] to generate synthetic points on the cumulative distribution function $F_X$. These synthetic points may be used to resample from the actual data to obtain the synthetic data.

Figure 1:
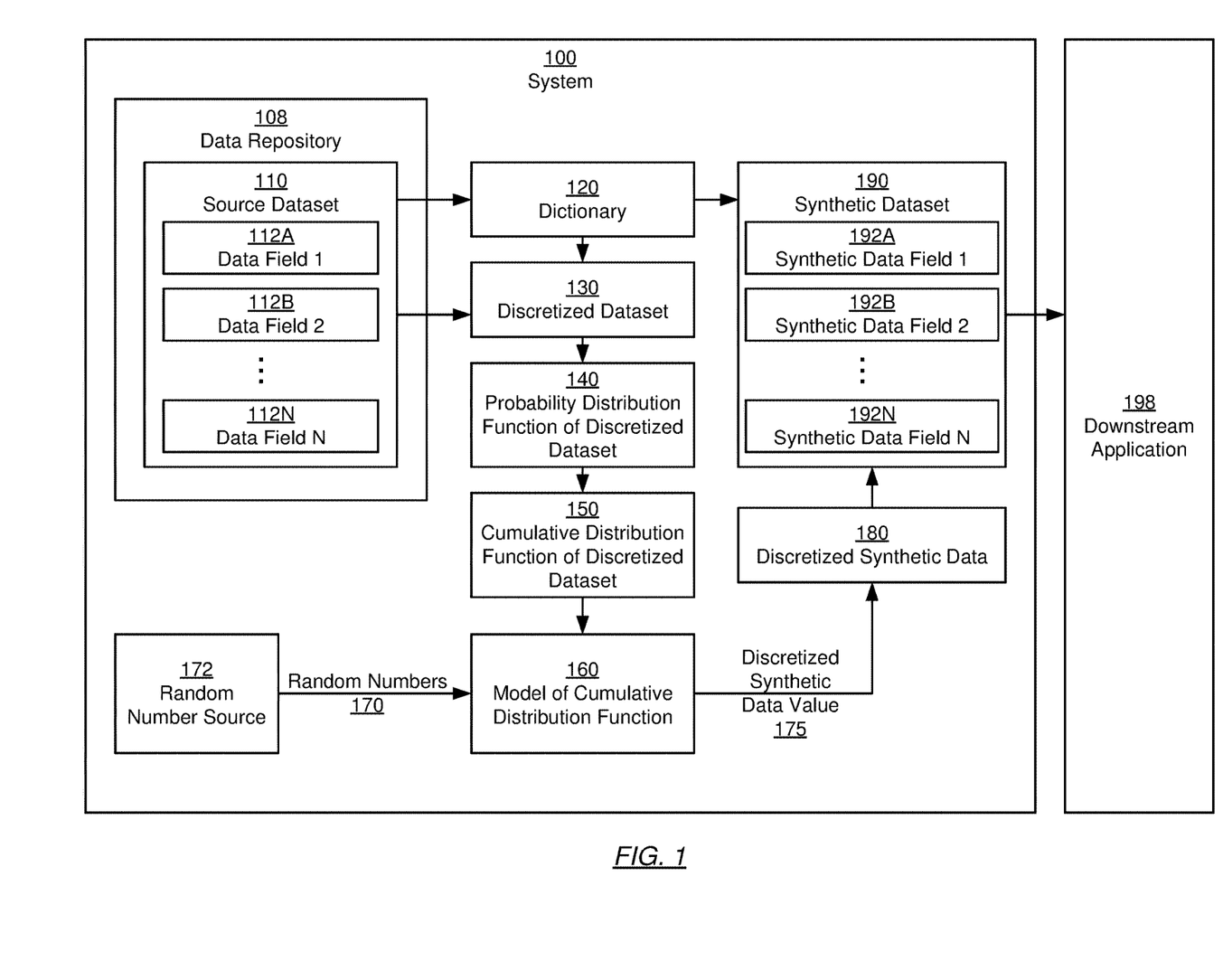
FIG. 1 shows a system for generating a synthetic data set, in accordance with one or more embodiments of the disclosure.

Turning to FIG. 1, a system (100) for generating a synthetic data set, in accordance with one or more embodiments, is shown. The system (100) may be implemented on a computing system as introduced below with reference to FIG. 6A and FIG. 6B. The system (100) may be local, on an enterprise server, or virtualized (e.g., in the cloud). The system (100) executes a set of machine-readable instructions (stored on a computer-readable medium) that enable the system (100) to generate a synthetic dataset (190) different from the source dataset (110), but with statistical characteristics of the source dataset (110). The generated synthetic dataset (190) may be of any size, as needed for one or more downstream applications (198). A description of the methods used for generating the synthetic dataset (190) is provided below with reference to the flowcharts of FIG. 3 and FIG. 4. The methods may be executed, for example, on a computing system as shown below in FIG. 6A and FIG. 6B.

FIG. 1 introduces the various data representations use for generating synthetic data. While FIG. 1 only briefly introduces these data representations, examples of the data representations are provided in FIG. 2, FIG. 5A, and FIG. 5B. Further, the steps performed to obtain these data representations are described in FIG. 3 and FIG. 4. The data representations shown in FIG. 1 may be stored in volatile and/or in non-volatile memory.

In embodiments of the invention, FIG. 1 shows a source dataset (110), a dictionary (120), a discretized dataset (130), a probability distribution function (140) of the discrete dataset, a cumulative distribution function (150) of the discrete dataset, a model (160) of the cumulative distribution function, random numbers (170), discretized synthetic data (180), and a synthetic dataset (190). Each of these elements is subsequently described.

Figure 2:
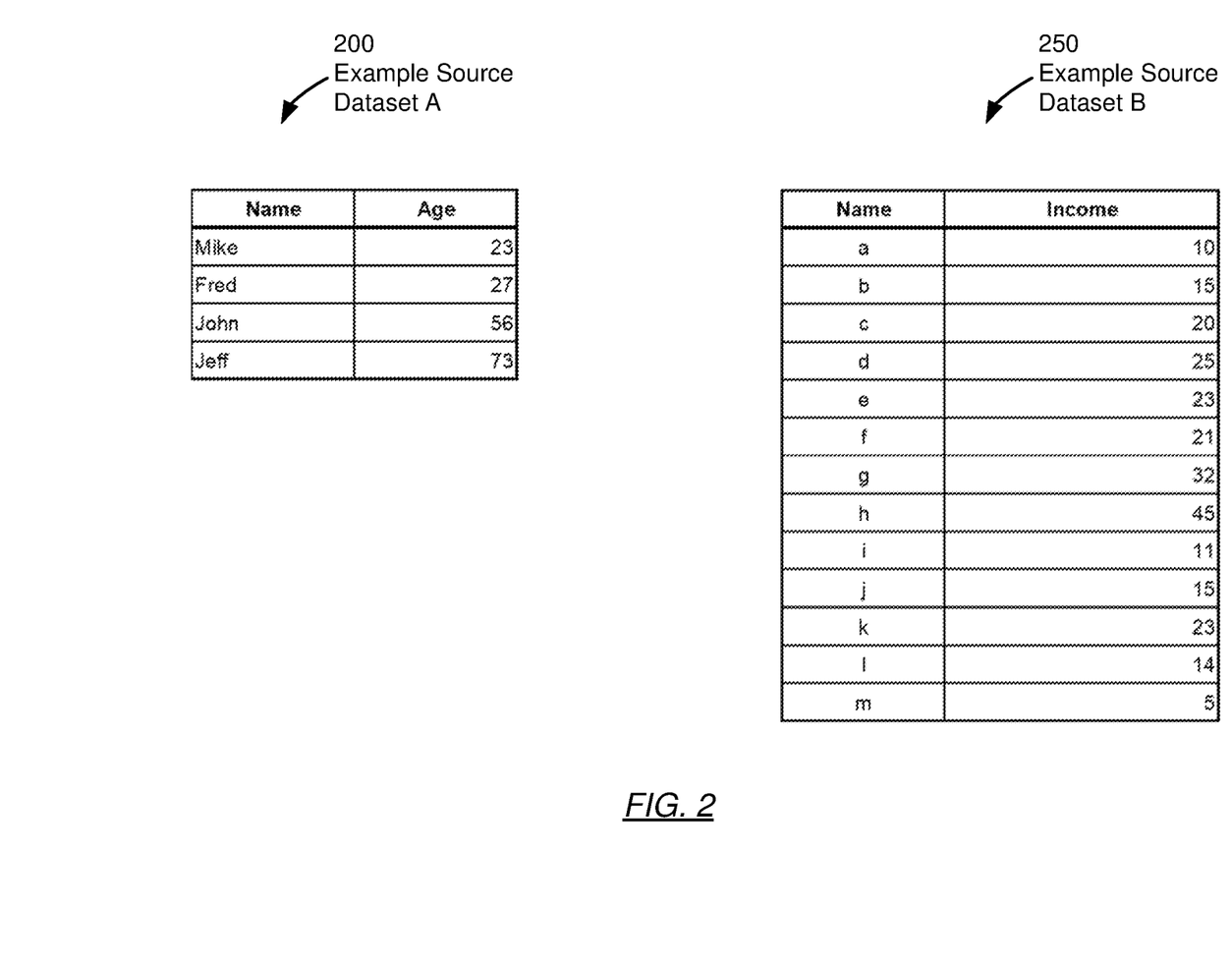
FIG. 2 shows examples of source datasets, in accordance with one or more embodiments of the disclosure.

The source dataset (110), in one or more embodiments, serves as the reference based on which the synthetic dataset (190) with similar characteristics is to be generated. The source dataset (110) may include tabular data, as shown in the examples of FIG. 2. The source dataset may include categorical and/or continuous data. The source dataset may include actual data, collected from, for example, users of a software application such as an accounting, tax preparation, or social media application. More broadly, the source dataset may include actual data of any kind of process or interaction. In one or more embodiments, the source dataset (110) is not suitable for use with downstream applications, for example, due to privacy concerns. The source dataset (110) may include any number of data fields (112A, 112B, 112N) of any type. For example, the source dataset (110) may include data fields for the name, age, and income of millions of users of a software application. A more detailed description of the source dataset (110) is provided below with reference to FIG. 2.

In one or more embodiments of the disclosure, the source dataset (110) is stored in a data repository (108). The data repository (108) may be any type of storage unit and/or device (e.g., a file system, database, collection of tables, or any other storage mechanism) for storing data. The data repository (108) may include multiple different storage units and/or devices. The multiple different storage units and/or devices may or may not be of the same type or located at the same physical site.

Figure 5A:
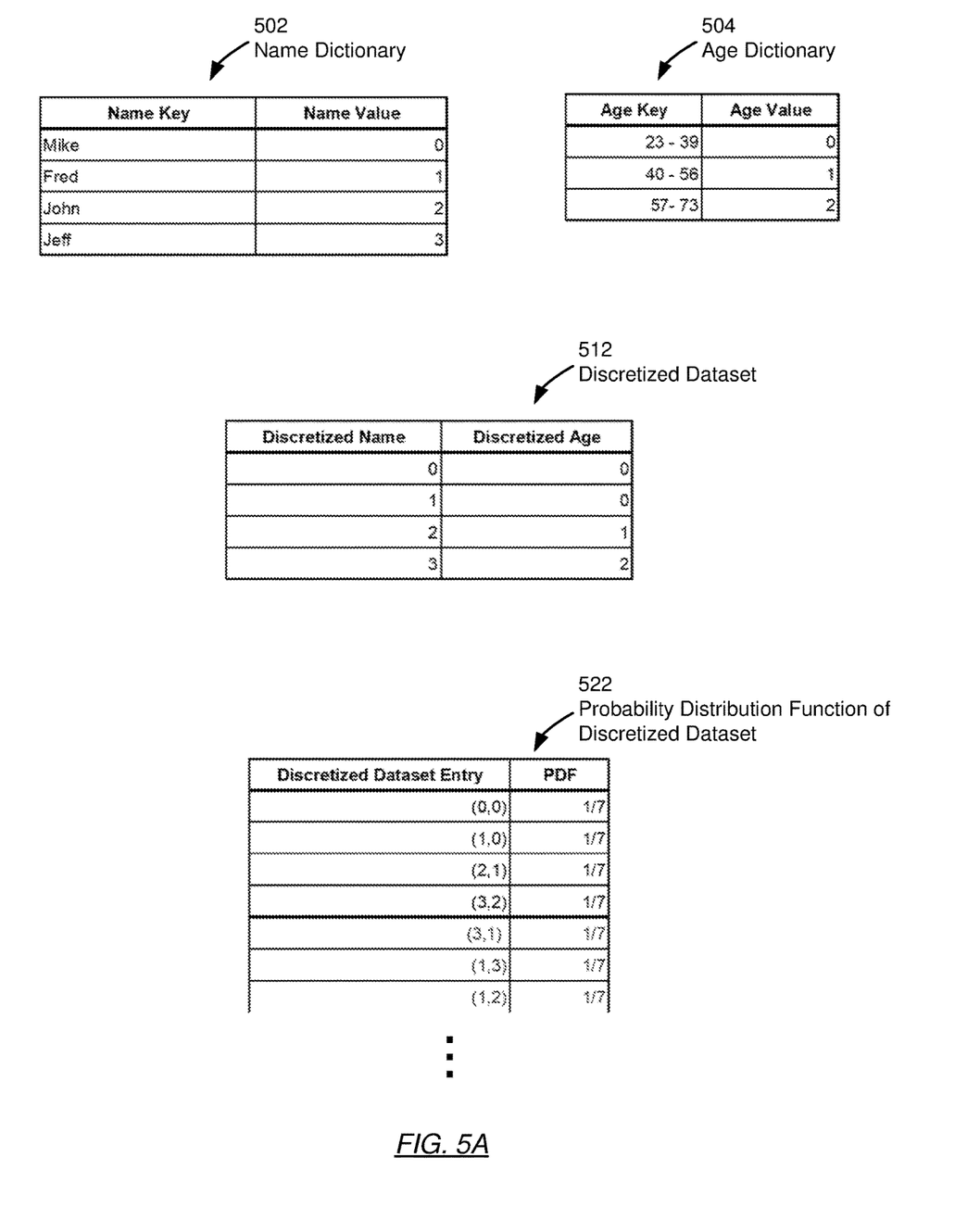
FIG. 5A and FIG. 5B show examples of dictionaries, a discretized dataset, a probability density function (PDF) of the discretized dataset, and a cumulative distribution function (CDF) of the discretized dataset, in accordance with one or more embodiments.

The dictionary (120), in one or more embodiments, establishes a mapping to be used for generating the discretized dataset (130). The mapping may be, for example, between names and integers, between numerical ranges and integers, etc. The mapping may enable further processing using numerical values only. For example, it may be challenging to perform a statistical processing of the names "Walter", "Peter", and "Fred" while such a statistical processing may be straightforward when these names are represented by the dictionary values "0", "1", and "2", respectively. The dictionary (120) may be stored in a table, and may allow a forward mapping (e.g., from a name to a number) and a backward mapping (e.g., from a number to a name). Multiple dictionaries (120) may be used. For example, one dictionary may be used to translate between names and numbers, one dictionary may be used to translate between income brackets and numbers, and another dictionary may be used to translate between age brackets and numbers. A detailed description of the generation of dictionaries (120) is provided below in Step 302 of FIG. 3. Further FIG. 5A shows examples of dictionaries.

The discretized dataset (130), in one or more embodiments, is a result of applying the dictionary (120) to the source data set (not shown). Accordingly, each of the data fields in the discretized dataset is a translation of the corresponding data field (112A-112N) as mandated by the dictionary. The discretized dataset (130) may be in table format. A detailed description of the generation of the discretized dataset (130) is provided below in Step 304 of FIG. 3. Further, FIG. 5A shows an example of a discretized dataset.

Figure 3:
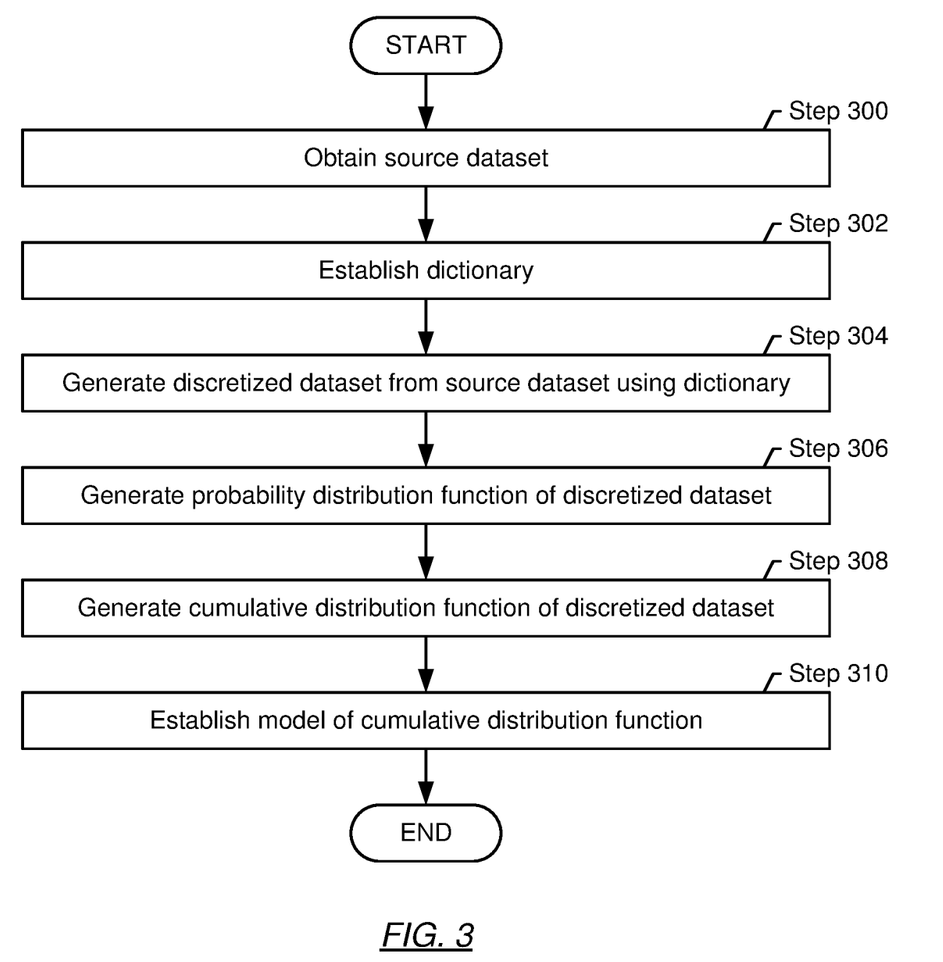
FIG. 3 shows a flowchart describing a method for obtaining a model of a cumulative distribution function (CDF), in accordance with one or more embodiments of the disclosure.
Figure 5B:
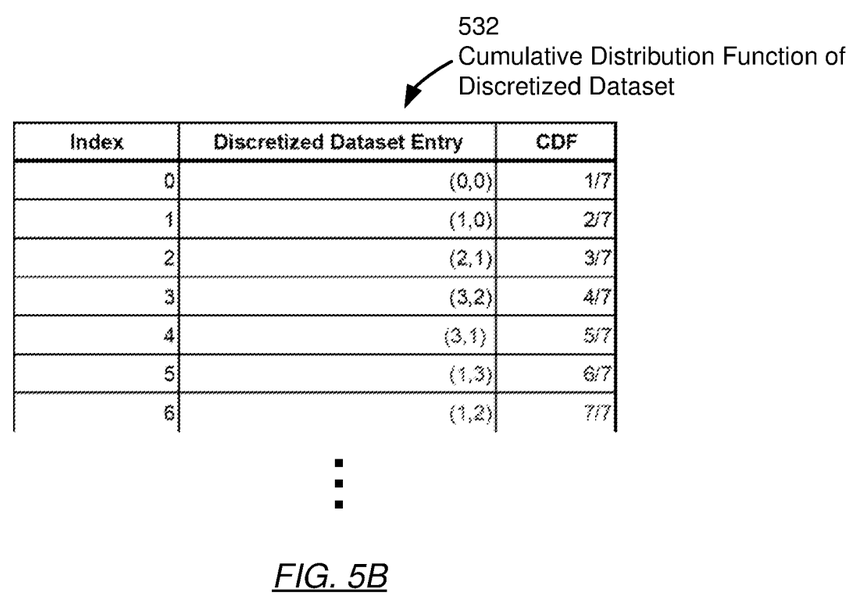

The probability distribution function (PDF) (140) of the discretized dataset (130), in one or more embodiments, reflects the discretized data set after binning and stacking, as described in detail in Step 306 of the flowchart of FIG. 3, and the cumulative distribution function (CDF) (150) may be directly derived from the PDF (140), as described in detail in Step 308 of the flowchart of FIG. 3 The PDF (140) as used here is a function that documents the probabilities of the entries in the source dataset (110) after translation to the discretized dataset (130). The CDF (150) is a function obtained by summation over the PDF (140). Both the PDF (140) and the CDF (150) include bins, each delimited by a lower and an upper boundary, with each bin accumulating elements of the discretized dataset that are located between the lower and upper boundaries. The PDF (140) and the CDF (150) may be in table format, and the elements (bins) of the PDF (140) and the CDF (150) are addressable using an index. FIG. 5A and FIG. 5B show an example of a PDF and a CDF, respectively.

The model (160) of the cumulative distribution function, in one or more embodiments, is a neural network regressor that mirrors the CDF (150). A feedforward neural network with, for example, ten hidden layer neurons and sigmoid activation functions may be used. The model (160) approximates the discrete CDF (150), generated from the discretized dataset (130), with a continuous function. The input to the model (160) may be a random number (170), e.g., in the interval [0, 1]. In response to the input, the model (160) may produce a discretized synthetic data value (175) which may be transformed back to the discrete indices of the CDF (150). The training of the model (160) is described in Step 310 of FIG. 3.

The discretized synthetic data (180), in one or more embodiments, include discretized dataset entries of the CDF (150). One discretized synthetic data value (175) may be obtained for each random number (170) being provided to the model (160). Each of the discretized synthetic data values may be an index that identifies a bin of the CDF (150). The application of the model (160) to obtain the discretized synthetic data (160) based on the random numbers (170) is described in Step 400 of FIG. 4.

The random numbers (170) may be obtained from a random number source (172). The random number source may be a random number generator, e.g., a pseudo random number generator producing uniformly distributed random numbers in a set interval, e.g., in a range between 0 and 1.

The synthetic dataset (190), in one or more embodiments, contains the synthetic data fields (192A, 192B, 192N) that are modeled after the data fields (112A, 112B, 112N) of the source dataset (110), while not being identical to the data fields (112A, 112B, 112N). Any number of synthetic data fields (192A, 192B, 192N) may be generated, based on the input of the discretized synthetic data (180). The obtaining of the synthetic dataset (190) is described in Step 402 of FIG. 4. The synthetic dataset (190) may be provided to downstream applications for further processing, and/or may be shared with collaborators without privacy concerns.

While FIG. 1 shows a configuration of components, other configurations may be used without departing from the scope of the disclosure. For example, various components may be combined to create a single component. As another example, the functionality performed by a single component may be performed by two or more components.

FIG. 2 shows examples of source datasets (200, 250), in accordance with one or more embodiments. A source dataset may be tabular data, as shown in the examples (200, 250). A source dataset may include many entries, e.g., hundreds, thousands, and even millions or billions of entries. The example source dataset (200) includes 4 entries organized in rows. The example source dataset (250) includes 13 entries, also organized in rows. A source dataset, in one or more embodiments, also includes data fields storing values. The example source datasets (200, 250) include two data fields, organized in two columns. Each data field may be specific to capturing a different aspect of data for the entries. In the example source dataset (200), one data field is used to capture a name, and another data field is used to capture an age. Accordingly, the example source dataset is used to capture names and ages of people. In the example source dataset (250), one data field is used to capture a name, and another data field is used to capture an income. Accordingly, the example source dataset is used to capture names and incomes of people. A source dataset may include more than two data fields. For example, a source dataset may capture name, age, income, zip code, number of children, marital status, etc., of people. Referring to the example source dataset A (200), for the user with the name "Mike", in addition to a value for age, there may be values for income, zip code, etc. in the corresponding data fields. Any number of data fields for any kind of data may be stored in a source data set. A data field may be set up to store continuous data or categorical data. For example, in FIG. 2, the names are categorical data, whereas the age and the income are continuous data. Categorical and continuous data may be treated differently as described below.

Figure 4:
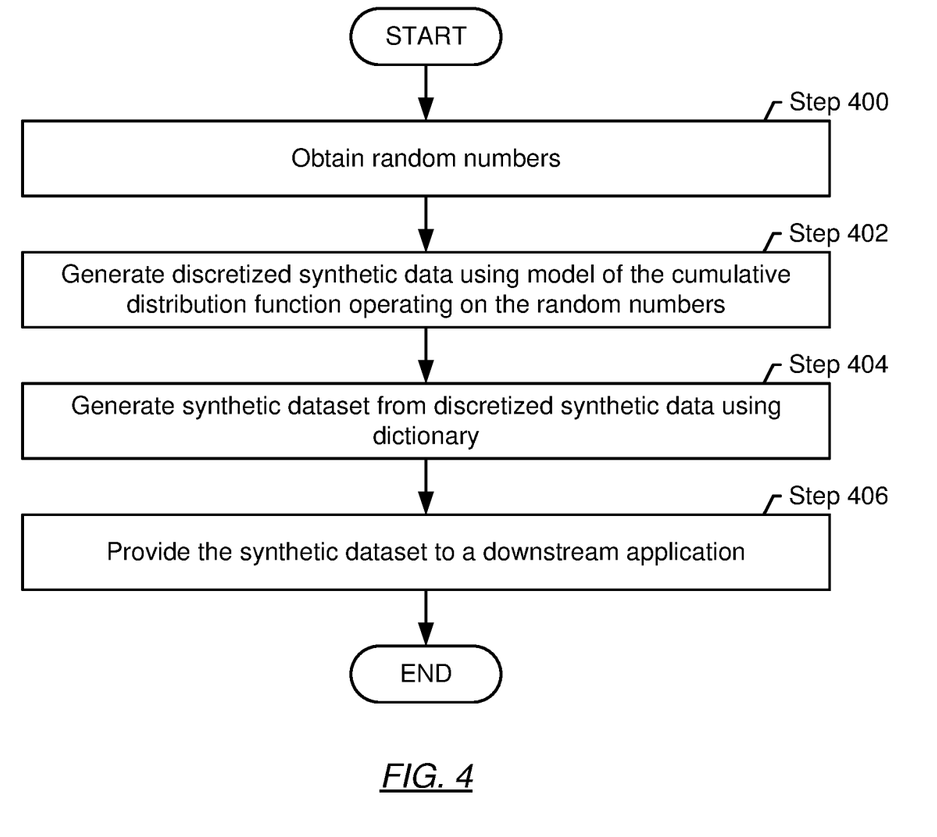
FIG. 4 shows a flowchart describing a method for obtaining a synthetic dataset, in accordance with one or more embodiments of the disclosure.

FIG. 3 and FIG. 4 show flowcharts in accordance with one or more embodiments of the disclosed technology. While the various steps in these flowcharts are provided and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the disclosure. By way of an example, determination steps may not require a processor to process an instruction unless an interrupt is received to signify that condition exists in accordance with one or more embodiments of the disclosure. As another example, determination steps may be performed by performing a test, such as checking a data value to test whether the value is consistent with the tested condition in accordance with one or more embodiments of the disclosure.

Turning to FIG. 3, a flowchart describing a method for obtaining a model of a cumulative distribution function (CDF), in accordance with one or more embodiments, is shown. In one or more embodiments, the method is performed prior to execution of the method of FIG. 4, which uses the model of the CDF. The method of FIG. 3 may be executed as soon as a source data set, to be used for generating the model of the CDF, becomes available, or at any other time prior to the execution of the method of FIG. 4. Various steps described in FIG. 3 are shown based on examples shown in FIG. 5A and FIG. 5B.

In Step 300, a source dataset is obtained. The source dataset may be a dataset as described in FIG. 2. The source dataset may be retrieved from a database or may be obtained from elsewhere.

In Step 302, one or more dictionaries are established. A separate dictionary may be established for each of the data fields. In one or more embodiments, a dictionary establishes a mapping between entries made for the data field described in the dictionary, and a dictionary value.

In the case of a data field configured for categorical data, numbers may be assigned to the categorical data. Consider, for example, the name dictionary (502), shown in FIG. 5A. The name dictionary is based on the example source dataset (200) of FIG. 2. Here, each name is assigned a number. This may facilitate further processing using methods such as statistical methods (e.g., to generate a cumulative distribution function (CDF), as described below), allowing the operations to be performed on numbers rather than names. While the example dictionary (502) is based on names, other dictionaries for categorical data may be generated in a similar manner.

In the case of a data field configured for continuous data, numbers may be assigned to numerical ranges. Consider, for example, the age dictionary (504), shown in FIG. 5A. The age dictionary is based on the example source dataset (200) of FIG. 2. Here, three age ranges or age intervals are generated. The number of age ranges being generated may be a hyperparameter that may be optimized. The age ranges that are generated are selected to evenly split (if possible) the total age range into the desired number of age ranges. In the example of age dictionary (504) the total age range of 23-73 is split into the intervals 23-39, 40-56, and 57-73. Each of these intervals is assigned a number. While the example dictionary (504) is based on age, other dictionaries for continuous data may be generated in a similar manner. In such scenarios, the age ranges may be replaced by other numerical ranges, as necessitated by the continuous data.

Separate dictionaries may be established for forward translation from entries in the data fields to the corresponding dictionary values and for backward translation from the dictionary values to the corresponding entries in the data fields.

In Step 304, a discretized dataset is generated from the source dataset using the one or more dictionaries. The discretized dataset may be obtained by replacing the entries in the data fields of the source dataset with the corresponding dictionary values. Consider the example source dataset (200) of FIG. 2. The discretized dataset (512) of FIG. 5A is obtained by applying the dictionaries (502 and 504) of FIG. 5A to the example source dataset (200).

In Step 306, a probability distribution function (PDF) of the discretized dataset is generated. The obtaining of the PDF may include determining probabilities of entries of the discretized dataset based on their occurrence in the discretized dataset. Consider the example discretized dataset (512) of FIG. 5A. To determine a probability of an entry, a frequency of the entry may be determined first. Based on the total number of entries, the probability may then be determined. In the example discretized dataset (512), the entries are: (0, 0), (1, 0), (2, 1), and (3, 2), representing (discretized name, discretized age). All of these entries are unique, and accordingly, the probability of each entry is ¼, stored in four bins. The example PDF (522) of FIG. 5A is based on these four entries and an additional three entries. Accordingly, the probability of each entry is 1/7, stored in seven bins (each represented by a row of the table establishing the PDF (522)), because each entry is still unique. With a larger dataset, it would be likely that some entries are identical, resulting in different probabilities when multiple entries are joined in the same bin. While the example PDF (522) is based on the combination of a discretized name and a discretized age, a PDF may be generated from datasets that include any number of data fields of any type.

In Step 308, a cumulative distribution function (CDF) of the discretized dataset is generated. The CDF may be obtained by accumulating the probabilities of the PDF. An example of a CDF (532) is shown in FIG. 5B. The example CDF is derived from the example PDF (522). Specifically, in the example, the CDF entries are obtained by summing over the PDF entries in an incremental manner. To obtain the first CDF entry, the first row of the PDF is considered. The first CDF entry, therefore, is 1/7. To obtain the second CDF entry, the first and the second row of the PDF are considered. The second CDF value, therefore, is 1/7+1/7=2/7, etc. An index enables identification of each of the bins of the CDF. Integer values may be used for the index.

In Step 310, a model of the CDF is generated. In one or more embodiments, the model of the CDF is a regression model. Accordingly, the discrete CDF is approximated by a continuous function. The regression model, in one or more embodiments, is implemented using a neural network as previously described. Other alternative implementations may be based on polynomial regression models and/or any other type of linear or nonlinear continuous model. The training of the neural network may be performed using backpropagation or other approaches such as, for example, a Limited Memory Broyden-Fletcher-Goldfarb-Shanno (L-BFGS) approach, genetic algorithms, etc. The input to the neural network may be uniformly distributed random numbers between 0 and 1, and during the training, pairs of values consisting of a random number and a corresponding normalized value (index) of the CDF may be used. Once trained, the neural network model may produce outputs based on the characteristics of the CDF, when provided with random numbers at the input.

Turning to FIG. 4, a flowchart describing a method for obtaining a synthetic dataset, in accordance with one or more embodiments, is shown. The method may be executed once the model of the CDF has been generated, as described in FIG. 3. The method of FIG. 4 may be executed at any time, for example, when synthetic data is needed. The method of FIG. 4 may, thus, be used as a method for securely driving a downstream application. Rather than using the source dataset which may include sensitive information, the synthetic dataset is used as a substitute, thereby avoiding disclosing the sensitive information.

In Step 400, random numbers are obtained. The random numbers used for the execution of Step 400, in one or more embodiments, are evenly distributed in a numerical range between 0 and 1. The random numbers may be generated by a pseudorandom number generator or by random number sources that are based on physical methods. Any number of random numbers may be obtained, depending on the volume of synthetic data that is desired.

In Step 402, discretized synthetic data is generated by the model of the CDF operating on the random numbers. The model of the CDF may transform or map a random number at the input to a value on the CDF, when driven with the random number. Accordingly, for each random number at the input of the model of the CDF, one discretized synthetic data value may be generated. As previously discussed, the output of the model of the CDF is a continuous number. The continuous number does not necessarily match an index value that identifies a bin of the CDF. Accordingly, in Step 402, a binning of the output of the model of the CDF may also be performed. The binning may be performed, for example, by a rounding operation to the nearest index value of the CDF. Consider, for example, a scenario in which the output of the model of the CDF is 1.8356. The bin that this output maps to is the bin with the index value "2". In the example of the CDF (532) of FIG. 5B, the index value "2" identifies the discretized dataset entry (2,1) which is subsequently used as the discretized synthetic data, in Step 404. As the model of the CDF continues to process random numbers, the random numbers may map to multiple indices. These multiple indices may in turn identify multiple discretized dataset entries.

In Step 404, a synthetic dataset is generated based on the discretized synthetic data obtained in Step 402. The synthetic dataset may be generated by processing the discretized dataset entries of the discretized synthetic data. Consider the previously introduced discretized dataset entry (2, 1). Based on the name dictionary (502), the dictionary value "2" stands for "John". Accordingly, the name "John" may be chosen for the synthetic dataset. Further, based on the age dictionary, the dictionary value "1" stands for an age range of 40 to 56. To obtain an age for the synthetic dataset, an additional processing step is necessary. In one or more embodiments, for continuous data (such as age), the distribution of the actual values in the intervals identified by the dictionary is resampled to choose one of the values for the synthetic dataset. The resampling may consider the distribution of the actual values.

The resampling may be performed as previously described. Specifically, a cumulative distribution function may be established for the values in the intervals identified by the dictionary. For example, a cumulative distribution of values may be computed based on all the age values that fall into the age range of 40 to 56. A model of the cumulative distribution may then be obtained. Subsequently, the model may be used to randomly select from the actual values, as dictated by the cumulative distribution. In the example of the age dictionary (504), only a single age value falls into the age range of 40 to 56. The value is "56", as may be verified by inspection of the example source dataset (200) of FIG. 2. Note that typical source datasets are considerably more comprehensive than the example source dataset (200). Accordingly, in a typical scenario, multiple values may be in a numerical range identified by a dictionary value. In such a scenario, the resampling identifies one of the multiple values as the value to be provided in the synthetic dataset. The resampling may further consider the distance of the output of the model of the CDF to the identified bin. In the previously introduced example, the output of the model of the CDF is 1.8356, and the bin identified by this output is the bin identified by the index value "2". Accordingly, there is a small distance between the model output and the actual bin value. The distance may be considered by biasing the resampling within the numerical range.

The steps of the method described in FIG. 4 may be executed repeatedly to obtain a synthetic dataset of a desired length. The synthetic dataset may be provided to a downstream application for further processing.

In Step 406, the synthetic dataset is provided to a downstream application. The downstream application may be any type of application that is configured to operate on the source dataset. Substitution of the source dataset by the synthetic dataset may allow the confidentiality of the source dataset to be maintained, while still enabling the downstream application to be operated. Consider, for example, a downstream application in the financial domain, e.g., tax or accounting software. In such a scenario, the source dataset is likely to contain confidential information of the users. The confidential information may include, but is not limited to, user identification information (e.g., a social security number, name, address, etc.), user demographics (e.g., age, socio-economic background, etc.), and user financial information (e.g., income, debt, tax paid, tax owed, etc.), organized in data fields. As part of the development of the financial software application, new features are added, requiring extensive testing, and in some cases training of underlying machine learning algorithms. Using the synthetic dataset to drive the downstream application, these development tasks can be fully performed, while avoiding the disclosure of the confidential user information. Later, the trained downstream application may operate on non-synthetic data. Because the non-synthetic data is assumed to be statistically similar to the synthetic dataset, the trained downstream application may operate correctly on the non-synthetic data, even though the training has been performed without relying on the source dataset. Similar applications exist in many other domains that are data-driven.

Various embodiments of the disclosure have one or more of the following advantages. Embodiments of the disclosure enable the generation of synthetic data. The synthesized data may have statistical properties reflecting the statistical properties of the underlying actual data, while not being identical, thereby addressing privacy concerns. Embodiments of the disclosure are applicable to numerical and categorical data. Embodiments of the disclosure are scalable and may produce synthetic data in a computationally efficient manner on commodity hardware. The compact representation of the CDF by a continuous function results in faster lookup times and/or reduced storage requirements in comparison to conventional reverse lookup-based methods. In comparison to generative adversarial networks (GANs) that have recently been used to generate synthetic data, embodiments of the disclosure also provide superior performance. More specifically, embodiments of the disclosure statistically outperform GANs. For example, it was found that the generated synthetic data has a higher diversity and is generated computationally more efficiently. A comparison was performed for three datasets: (i) the census income dataset by Kohavi and Becker (Kohavi, R.; Becker, B.; 1996. Census Income Data Set. UCI machine learning repository. URL: archive.ics.uci.edu/ml/datasets/census+income); (ii) the covertype dataset by Blackard et al. (Blackard, J.; Dean, D.; Anderson, C. 1998. Covertype Data Set. UCI machine learning repository. URL: archive.ics.uci.edu/ml/datasets/covertype); and (iii) a proprietary financial dataset (including purchase information, and its columns included transaction ID's, ID's of customers, dates of purchase and amount of purchase). These datasets involve classification problems. Various classification algorithms with different parameterizations were used. These classification algorithms included decision trees with various depths, random forests with various depths, and deep neural networks. All classifiers when operating on the synthetic data generated using embodiments of the disclosure consistently performed better than when operating in the synthetic data generated using GANs. The performance was assessed using the performance gap, i.e., the difference between performance when operating on the synthetic dataset compared to when operating on the source dataset. The performance gap was consistently smaller for embodiments of the disclosure, in comparison to GANs. It was also found that in various situations, the performance gap for embodiments of the disclosure was small enough to make the performance difference negligible when comparing operation on the synthetic dataset to operation on the source dataset. Additional performance evaluations have shown that the correlation between the columns of tabular datasets is preserved. In addition to the performance advantages, embodiments of the disclosure may also be suitable to operate on datasets with missing values, high-dimensional, and sparse datasets.

Figure 6A:
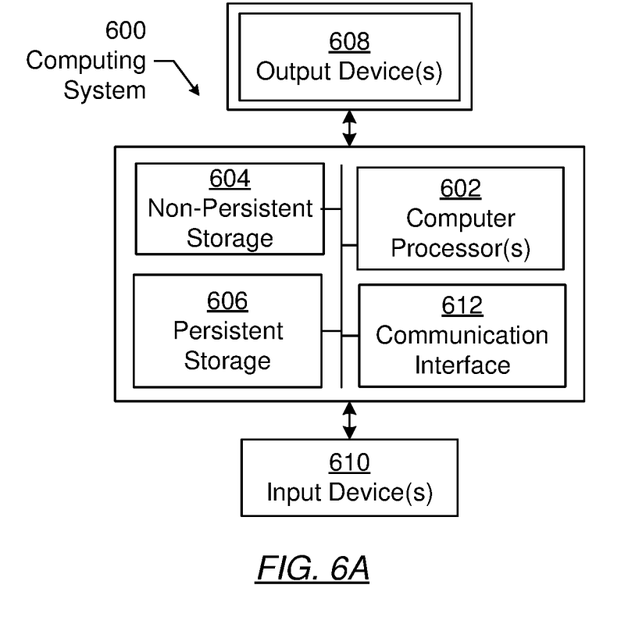
FIG. 6A and FIG. 6B show computing systems, in accordance with one or more embodiments of the disclosure.

Embodiments of the disclosure may be implemented on a computing system. Any combination of mobile, desktop, server, router, switch, embedded device, or other types of hardware may be used. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

Figure 6B:
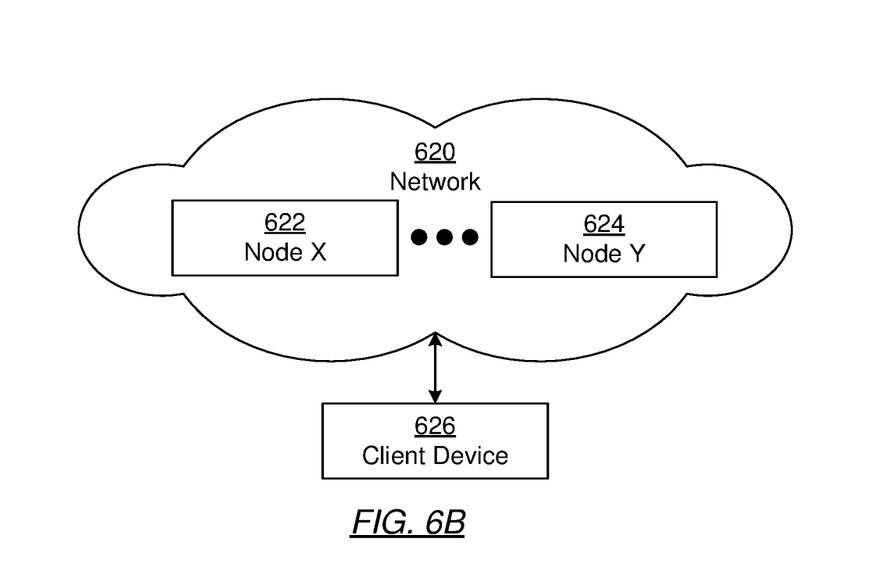

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments of the disclosure may be implemented on a node of a distributed system that is connected to other nodes. By way of another example, embodiments of the disclosure may be implemented on a distributed computing system having multiple nodes, where each portion of the disclosure may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor (e.g., a central processing unit (CPU) or a graphics processing unit (GPU)) or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments of the disclosure.

The computing system or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 6A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6A, while performing one or more embodiments of the disclosure, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases. Another type of data repository is a key value store.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 6A and the nodes and/or client device in FIG. 6B. Other functions may be performed using one or more embodiments of the disclosure.

While a limited number of embodiments have been described, those skilled in the art, having benefit of this disclosure, will appreciate that other embodiments can be devised which do not depart from the scope of the disclosure. Accordingly, the scope of the invention should be limited only by the attached claims.

What is claimed is:

1. A method for generating a synthetic dataset, the method comprising:
   generating discretized synthetic data based on driving a model of a cumulative distribution function (CDF) with random numbers,
      wherein the CDF is based on a source dataset,
      wherein the model outputs continuous numbers rounded to a nearest index value of the CDF, and
      wherein the model outputs the continuous numbers and the continuous numbers are binned to indices that identify bins of the CDF;
   generating the synthetic dataset from the discretized synthetic data, comprising:
      selecting, for inclusion into the synthetic dataset, values from a plurality of entries of the source dataset, based on the discretized synthetic data; and
   providing the synthetic dataset to a downstream application that is configured to operate on the source dataset.

2. The method of claim 1, wherein the model of the CDF is a regression model implemented by a neural network.

3. The method of claim 2, wherein the regression model operates on the random numbers that are uniformly distributed in a range between 0 and 1.

4. The method of claim 2,
   wherein the discretized synthetic data comprise the indices that identify the bins of the CDF.

5. The method of claim 1, wherein generating the synthetic dataset from the discretized synthetic data further comprises resampling the values of the source dataset.

6. The method of claim 1, wherein identifying the values from the plurality of entries in the source dataset comprises translating, based on a dictionary, values in the bins of the CDF to the values in the source dataset.

7. The method of claim 1, wherein the values of the source dataset are of a plurality of data fields, the plurality of data fields each corresponding to one of user identification information, user financial information, and user demographics.

8. The method of claim 1, wherein the values of the source dataset comprise at least one selected from the group consisting of continuous data and categorical data.

9. The method of claim 1, further comprising, prior to generating the discretized synthetic data:
   obtaining the source dataset, the source dataset comprising the plurality of entries for a plurality of data fields;
   generating a dictionary for each of the plurality of data fields, wherein each dictionary establishes a mapping between the entries of the data field associated with the dictionary and corresponding dictionary values;
   generating the discretized dataset from the source dataset by replacing the plurality of entries for the plurality of data fields by the corresponding dictionary values;
   generating the CDF based on the discretized dataset; and
   training the model of the CDF.

10. The method of claim 9, wherein generating the CDF comprises establishing the bins of the CDF based on a combination of the plurality of data fields.

11. The method of claim 9, wherein generating the model of the CDF comprises training a neural network that approximates the CDF when provided with the random numbers, wherein the random numbers are distributed uniformly.

12. A method for securely driving a downstream application, the method comprising:
   obtaining a source dataset for driving the downstream application;
   generating a discretized dataset from the source dataset;
   generating a cumulative distribution function (CDF) for the discretized dataset;
   establishing a model of the CDF;
   obtaining random numbers;
   generating discretized synthetic data by driving the model of the CDF with the random numbers,
      wherein the discretized synthetic data comprises indices identifying bins of the CDF,
      wherein the model outputs continuous numbers rounded to a nearest index value of the CDF, and
      wherein the model outputs the continuous numbers and the continuous numbers are binned to the indices that identify the bins;
   generating a synthetic dataset by selecting, for the synthetic dataset, values from a plurality of entries in the source dataset, based on the bins; and
      providing the synthetic dataset to the downstream application as a substitute for the source dataset.

13. The method of claim 12,
wherein the downstream application comprises an algorithm being trained, using the synthetic dataset, and
wherein, after the training, the downstream application operates on non-synthetic data.

14. The method of claim 12, wherein the downstream application is a financial software application.

15. The method of claim 12, wherein the source dataset comprises at least one selected from a group consisting of user identification information, user financial information, and user demographics.

16. A system for generating a synthetic dataset, the system comprising:
a random number source configured to generate random numbers with a uniform distribution;
a data repository storing a source dataset; and
a computer processor configured to execute instructions to perform:
obtaining the source dataset;
generating a discretized dataset from the source dataset;
generating a cumulative distribution function (CDF) for the discretized dataset;
establishing a model of the CDF;
obtaining the random numbers from the random number generator;
generating discretized synthetic data by driving the model of the CDF with the random numbers,
wherein the discretized synthetic data comprises indices identifying bins of the CDF,
wherein the model outputs continuous numbers rounded to a nearest index value of the CDF, and
wherein the model outputs the continuous numbers and the continuous numbers are binned to the indices that identify the bins; and
generating the synthetic dataset by selecting, for the synthetic dataset, values from a plurality of entries in the source dataset, based on the bins.

17. The system of claim 16, further comprising a downstream application configured to operate on the source dataset,
wherein the processor is further configured to providing the synthetic dataset to the downstream application, and
wherein the downstream application operates on the synthetic dataset providing a substitute for the source dataset.

18. The system of claim 16, wherein the model of the CDF is a regression model.

19. The system of claim 18, wherein the regression model is implemented by a neural network.

20. The system of claim 16, wherein the source dataset comprises at least one selected from a group consisting of continuous data and categorical data.

\* \* \* \* \*